(12) United States Patent
Nishio et al.

(10) Patent No.: US 9,214,756 B2
(45) Date of Patent: Dec. 15, 2015

(54) CONNECTOR, CONNECTOR MANUFACTURING METHOD, AND METHOD FOR CONNECTING WIRE HARNESS AND WIRING MATERIALS TO MEMBER TO BE CONNECTED

(75) Inventors: Akihiro Nishio, Yokkaichi (JP); Hiroki Hirai, Yokkaichi (JP); Koichi Matsumoto, Yokkaichi (JP); Hiroki Shimoda, Yokkaichi (JP); Yasuo Omori, Yokkaichi (JP); Xueqing Dong, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/005,498

(22) PCT Filed: Apr. 26, 2012

(86) PCT No.: PCT/JP2012/002856
§ 371 (c)(1),
(2), (4) Date: Sep. 16, 2013

(87) PCT Pub. No.: WO2012/164823
PCT Pub. Date: Dec. 6, 2012

(65) Prior Publication Data
US 2014/0294349 A1 Oct. 2, 2014

(30) Foreign Application Priority Data
Jun. 3, 2011 (JP) ................................. 2011-124890

(51) Int. Cl.
| G02B 6/36 | (2006.01) |
| H01R 13/52 | (2006.01) |
| H01R 43/00 | (2006.01) |
| G02B 6/42 | (2006.01) |
| H01R 12/72 | (2011.01) |

(52) U.S. Cl.
CPC .......... *H01R 13/5213* (2013.01); *G02B 6/4284* (2013.01); *H01R 43/005* (2013.01); *H01R 12/721* (2013.01); *Y10T 29/49208* (2015.01)

(58) Field of Classification Search
USPC ............................. 385/92; 439/278, 281, 405
See application file for complete search history.

(56) References Cited

U.S. PATENT DOCUMENTS

| 6,132,230 A | * | 10/2000 | Shinozaki et al. | ............ 439/281 |
| 7,997,917 B1 | * | 8/2011 | O'Neill et al. | ................ 439/275 |
| 2007/0281538 A1 | * | 12/2007 | Elliott et al. | .................. 439/405 |

FOREIGN PATENT DOCUMENTS

| JP | 54-76993 | 5/1979 |
| JP | 62-290081 | 12/1987 |
| JP | 03-182072 | 8/1991 |
| JP | 08 250195 | 9/1996 |
| JP | A-2001-042174 | 2/2001 |
| JP | A-2003-178834 | 6/2003 |
| JP | 3135572 | 8/2007 |

* cited by examiner

*Primary Examiner* — Eric Wong
(74) *Attorney, Agent, or Firm* — Oliff PLC (57) ABSTRACT

A connector includes a terminal member including a contact portion that can be brought into contact with a connecting target member, the terminal member being attached to an end of a wiring material, a housing including an insertion recess into which the connecting target member can be inserted, the housing retaining the terminal member such that the contact portion can be brought into contact with the connecting target member inserted into the insertion recess, and a dust protection member that protects the insertion recess against dust by blocking an insertion opening of the insertion recess. The dust protection member is formed such that the dust protection member can be penetrated by the connecting target member when the connecting target member is inserted into the insertion recess.

12 Claims, 8 Drawing Sheets

CONNECTOR, CONNECTOR MANUFACTURING METHOD, AND METHOD FOR CONNECTING WIRE HARNESS AND WIRING MATERIALS TO MEMBER TO BE CONNECTED

BACKGROUND

Some disclosed embodiments relate to a connector, such as a card edge connector, a method for manufacturing the connector, a wire harness in which the connector is provided at an end of a wiring material, and a method for connecting the wiring material to a connecting target member.

In some related art automobile manufacturing processes, wires (wiring materials) of a wire harness are connected to electrical equipment incorporated in a vehicle body while installing the wire harness in the vehicle body. For example, a connector is attached to ends of the wires beforehand, and this connector is connected to a circuit board, such as an ECU, provided in the vehicle body. A wide variety of related art connectors exist, and a card edge connector may be used for electrical connection to a meter unit and the like of an instrument panel.

One related art card edge connector is disclosed in JP 2003-178834A. This disclosed card edge connector includes connector terminals that are attached to corresponding terminals of a plurality of wires, and a housing that retains these connector terminals and has a board insertion recess into which a circuit board can be inserted. Each connector terminal includes an elastic contactor that is capable of elastic displacement. The housing retains the connector terminals, such that the elastic contactors of the connector terminals sandwich a circuit board that is inserted into the board insertion recess from both sides of the circuit board, and a plurality of terminals are arranged side-by-side in a width direction of the circuit board. Thus, when a circuit board is inserted into the board insertion recess of the housing, the elastic contactors of the connector terminals come into pressure contact with corresponding connecting conductors of the circuit board, thereby electrically connecting the wires to the circuit board.

SUMMARY

In the above disclosed card edge connector, the board insertion recess has a relatively wide insertion opening, and the elastic contactors of the connector terminals face the interior of the board insertion recess so as to be able to sandwich the circuit board from both sides thereof. For this reason, if an unconnected state continues, foreign matter, such as dust, may enter the board insertion recess, adhere to the elastic contactors, and cause a bad contact.

In order to address this issue and thereby protect the board insertion recess against dust, a cap can be manufactured from a material equivalent to that of the housing, and the cap can remain attached to the housing until just before a circuit board is connected. However, in this case, the manufacture of the cap, and the operations of attaching the cap to the housing and removing the cap from the housing, increase the number of man-hours and lead to a high cost.

These problems may also arise with respect to, for example, optical connectors. An optical connector has a structure in which a tube-shaped optical fiber terminal, such as a ferrule, attached to an end portion of an optical fiber core is retained by a housing, and optical fibers are connected to each other in an abutted state by fitting a housing of a male connector, which has a male housing, into a housing of a female connector, which has a female housing. In that case, since the female housing of the female connector further includes, in an inner end portion of an insertion recess into which the male housing of the male connector is inserted, a fiber hole into which the optical fiber terminal of the male connector is inserted, there is a risk that foreign matter may enter the fiber hole from the insertion recess and cause a bad connection.

The problem of the entry of foreign matter as described above is not limited to card edge connectors and optical connectors. Common connectors, especially connectors having relatively large connector fitting openings, may also be subject to similar problems.

Some of the disclosed embodiments address some or all of the above circumstances, and thus provide a technology that can effectively prevent, impede or reduce the occurrence of a bad connection due to the entry of dust in a connector, such as a card edge connector, while reducing or suppressing increases in the number of man-hours and the cost.

A connector according to one embodiment connects a wiring material to a connecting target member, and provides a dust protection function. The connector includes a terminal member including a contact portion that can be brought into contact with the connecting target member, the terminal member being attached to an end of the wiring material, a housing including an insertion recess into which the connecting target member can be inserted, the housing retaining the terminal member such that the contact portion can be brought into contact with the connecting target member inserted into the insertion recess, and a dust protection member that protects the insertion recess against dust by blocking an insertion opening of the insertion recess. The dust protection member is formed such that the dust protection member can be penetrated by the connecting target member when the connecting target member is inserted into the insertion recess.

DESCRIPTION OF EMBODIMENTS

Hereinafter, embodiments of the present invention will be described based on the drawings.

First Embodiment

Figure 1:
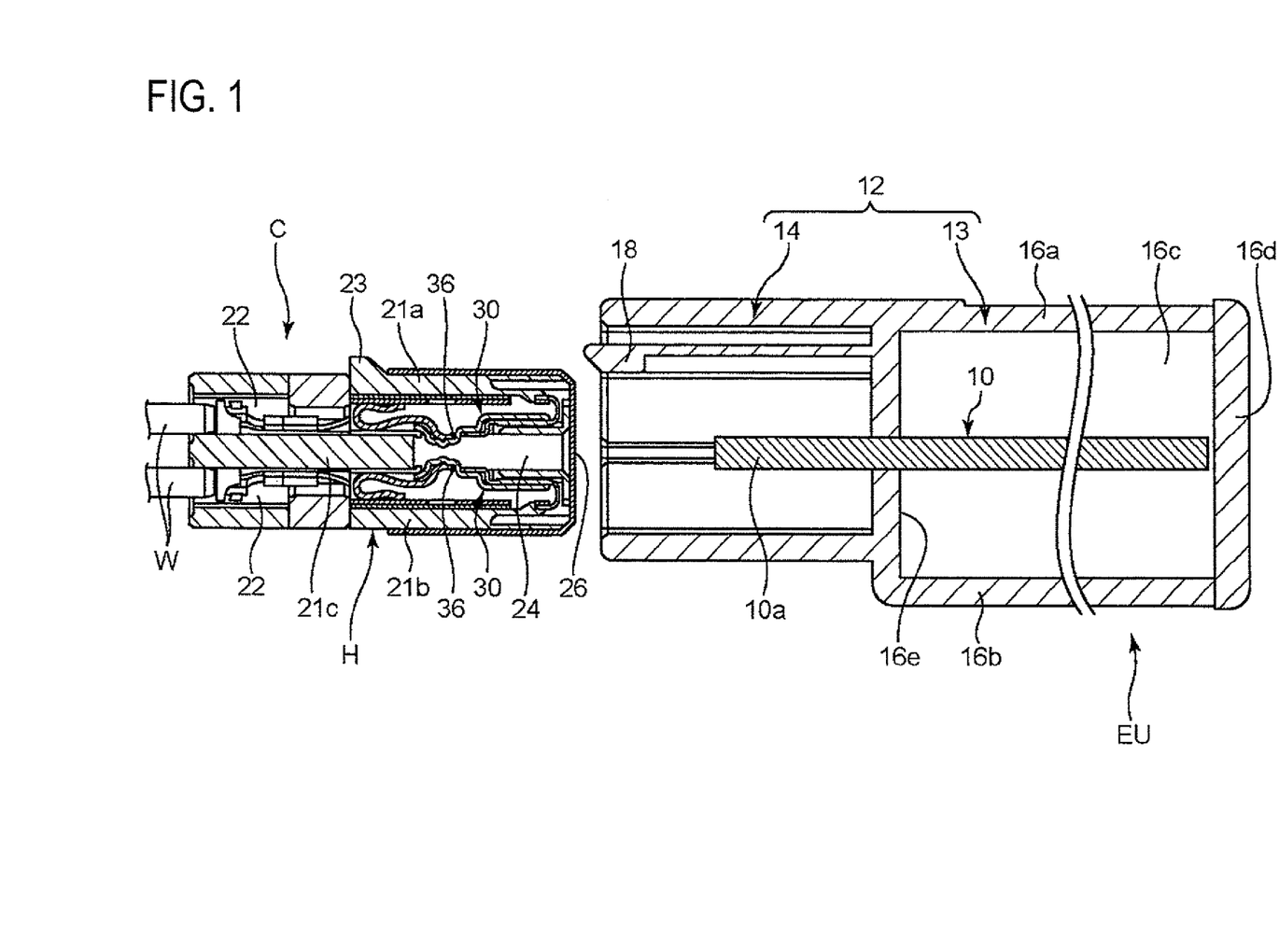
FIG. 1 is a cross-sectional view of a card edge connector according to an embodiment, and an electronic circuit unit that includes a circuit board to which the card edge connector is connectable (cross-sectional view showing a state before connection)
Figure 2:
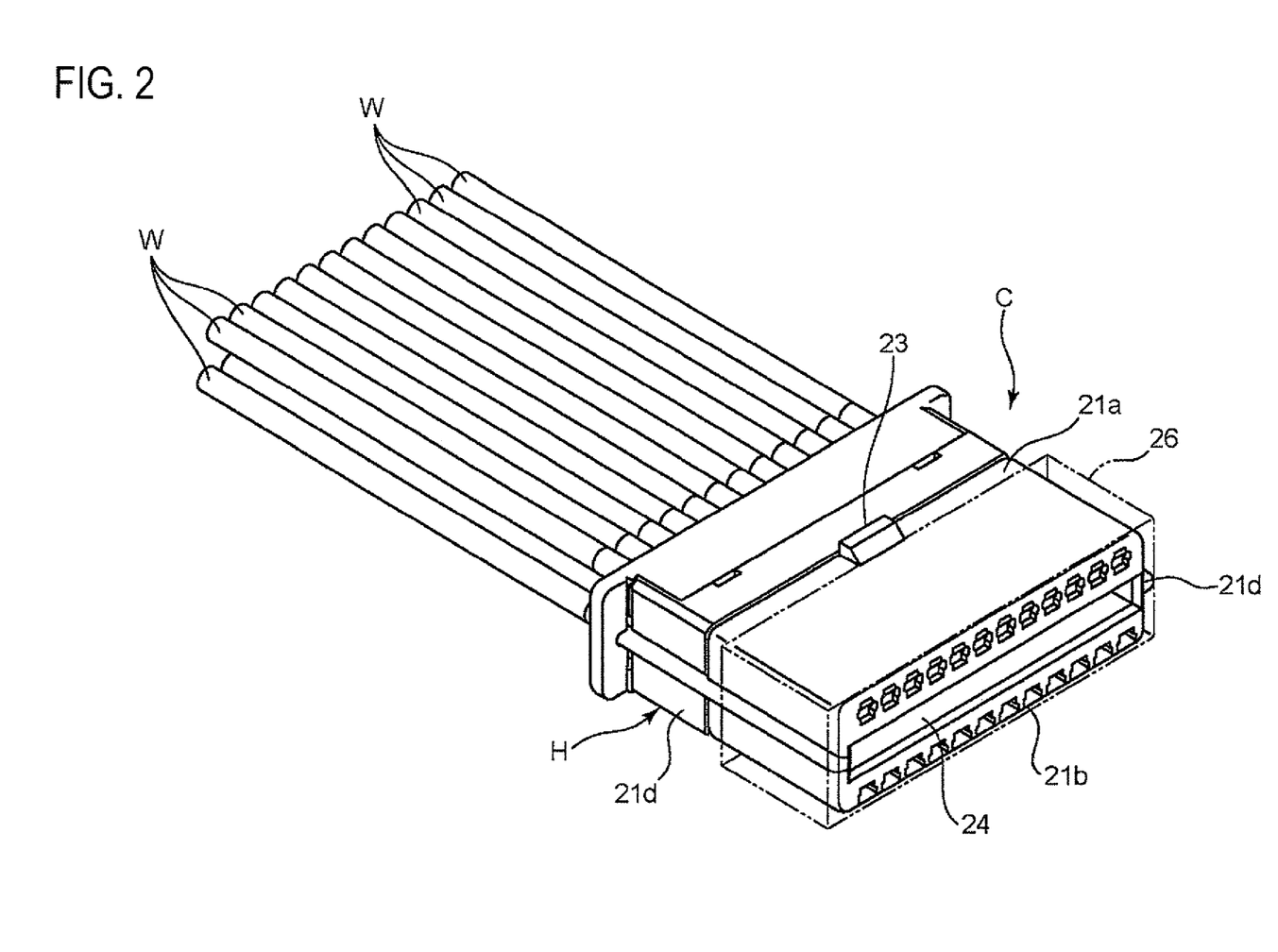
FIG. 2 is a perspective view of the card edge connector.

FIG. 1 is a cross-sectional view showing a relevant portion of a wire harness according to an embodiment, and specifically, a connector C that is attached to ends of wires (wiring materials) and an electronic circuit unit EU to which that connector is to be connected (cross-sectional view of a state before connection). FIG. 2 is a perspective view of the connector C.

The electronic circuit unit EU has a circuit board 10 and a case 12 in which this circuit board 10 is accommodated. The circuit board 10 is composed of, for example, a printed circuit board. A conductor pattern for a circuit configuration is arranged and electronic components that constitute a circuit are mounted on both surfaces of the circuit board 10. The circuit board 10 according to this embodiment has a rectangular shape, and a plurality of thin plate-shaped connecting conductors are provided on each of the front surface and the back surface of an edge portion 10a (left edge portion in this drawing) on one end side of the circuit board 10. These connecting conductors are arranged along the edge portion 10a.

The case 12 is produced by forming an insulating material, such as plastic, and is tube-shaped having a rectangular shape in cross-section and having a top wall 16a, a bottom wall 16b, a pair of left and right side walls 16c, and a rear wall portion 16d. The case 12 further has (in its interior) a partition wall 16e, which partitions the interior of the case 12 into a board accommodating portion 13 and a connector fitting portion 14 that opens in a specific direction.

The circuit board 10 is accommodated in the board accommodating portion 13 in a state in which the edge portion 10a protrudes into the connector fitting portion 14 through an opening formed in the partition wall 16e. More specifically, both the left and right ends of the circuit board 10 are inserted into corresponding guide grooves, which are not shown, formed in the respective side walls 16c, and thus the circuit board 10 is accommodated between the top wall 16a and the bottom wall 16b in a state in which it is substantially parallel to these walls. The rear wall portion 16d of the case 12 is removable from the rest of the case 12, and thus the board accommodating portion 13 can be opened on a side that is opposite to the connector fitting portion 14.

Although an overall view of the wire harness is not shown, the wire harness is a branched wire group constituted by a plurality of wires that are drawn out from a trunk line, which is formed by a plurality of wires being bound together. As shown in FIG. 1, ends of the wires W included in this branched wire group are fitted with the shared connector C for connecting the wires W to the electronic circuit unit EU.

The connector C can be referred to as a card edge connector, and is connectable to the edge portion 10a of the circuit board 10. The connector C includes a housing H that is produced by forming an insulating material, such as plastic, and connector terminals 30 that are attached to the corresponding wires W and retained by the housing H.

Each connector terminal 30 (hereinafter simply referred to as "terminal 30") is formed of a metal plate, which is a conductor, and is attached to a terminal of the corresponding wire W. Each wire W is constituted by a conductor, which is not shown, and an insulating coating that encloses the conductor, and the terminal of the wire W is stripped of the insulating coating to expose the conductor.

Figure 5:
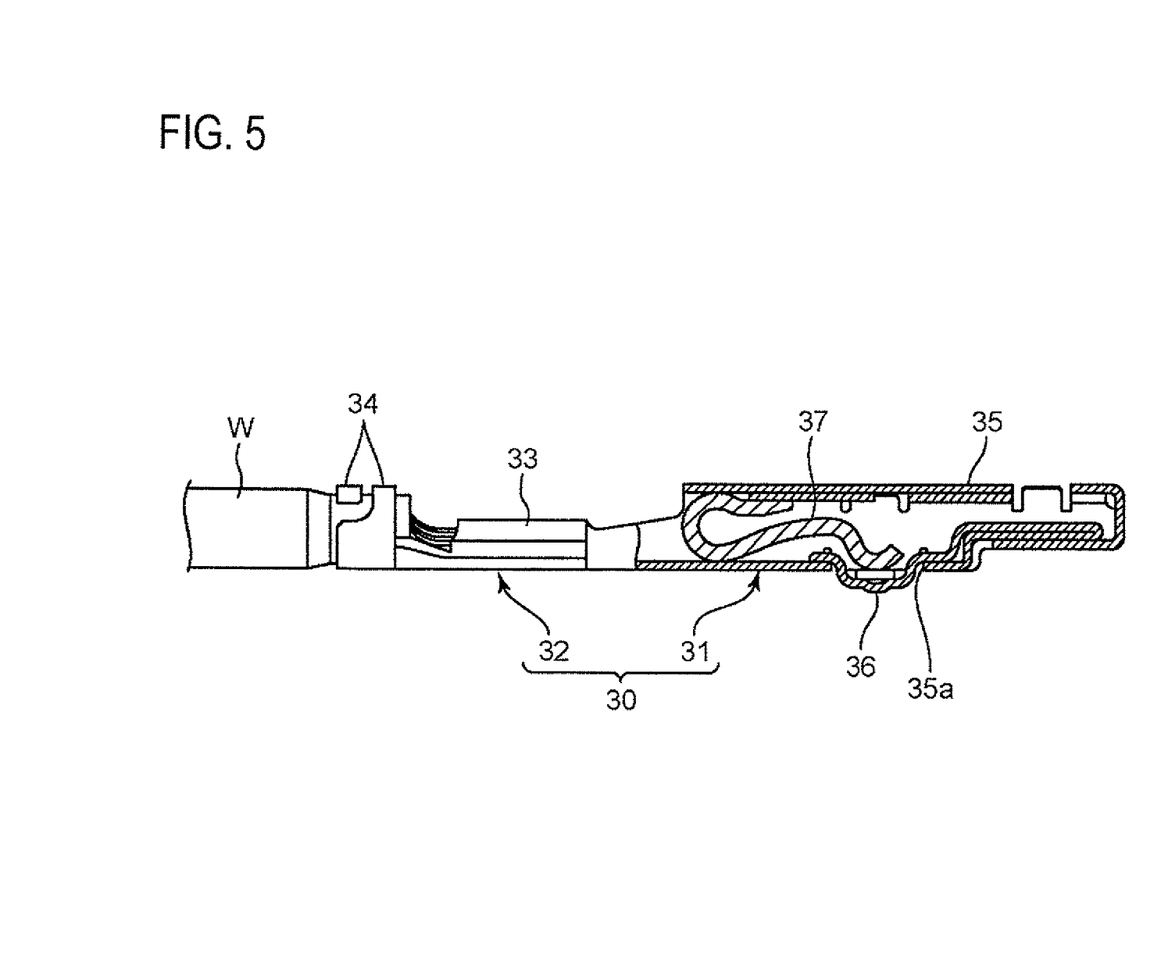
FIG. 5 is a cross-sectional view of a connector terminal that is applied to the card edge connector.

As shown in FIG. 5, the terminal 30 has a board contact portion 31 and a wire connecting portion 32 that are arranged forward and rearward with respect to a terminal axial direction. The wire connecting portion 32 has a pair of conductor barrels 33 on the front side and a pair of insulation barrels 34 on the rear side. The conductor barrels 33 are crimped onto the exposed conductor at the terminal of the wire W so as to wrap around the exposed conductor. The insulation barrels 34 are crimped onto the wire W so as to wrap around a portion of the insulating coating that is situated rearward of the exposed portion of the conductor. Thus, the terminal 30 is attached to the end of the wire W in a state in which there is electrical continuity between the terminal 30 and the conductor.

The board contact portion 31 has a box-shaped main body portion 35 extending in the terminal axial direction, and an elastic contactor 36 having a shape that bulges from this main body portion 35 in a direction orthogonal to the terminal axial direction. The elastic contactor 36 bulges from the inside of the main body portion 35 through a window 35a to the outside of the main body portion 35 in a bow shape. When this elastic contactor 36 comes into contact with a connecting conductor on the edge portion 10a of the circuit board 10, the elastic contactor 36 is bent and displaced so as to be retracted into the window 35a under a reaction force from the edge portion 10a, and its spring force brings the elastic contactor 36 into pressure contact with the connecting conductor. Reference numeral 37 in FIG. 5 indicates a spring force reinforcement member 37 that is provided within the main body portion 35. The spring force reinforcement member 37 elastically deforms in accordance with the bending displacement of a contact end portion 36a, thereby reinforcing an elastic returning force of the contact end portion 36a.

The housing H collectively retains the terminals 30 in an array that allows the elastic contactors 36 of the respective terminals 30 to simultaneously come into contact with the corresponding connecting conductors on the edge portion 10a of the circuit board 10.

More specifically, as shown in FIG. 1, the housing H has a pair of upper and lower walls, namely, a top wall 21a and a bottom wall 21b that extend parallel to each other, an intermediate wall 21c that is located between the top wall 21a and the bottom wall 21b, and a pair of left and right side walls 21d (shown in FIG. 2). A plurality of terminal accommodation compartments 22 that are arranged side-by-side in a left-right direction (direction orthogonal to the paper plane in FIG. 1) are formed between the top wall 21a and the intermediate wall 21c and between the bottom wall 21b and the intermediate wall 21c. A front end (right end in FIG. 1) of the intermediate wall 21c is located rearward of front ends of the top wall 21a and the bottom wall 21b. A board insertion space (hereinafter referred to as "insertion recess 24") into which the edge portion 10a of the circuit board 10 can be inserted is secured forward of the front end of the intermediate wall 21c. In addition, the terminals 30 are accommodated in the respective terminal accommodation compartments 22 in a state in which the elastic contactors 36 of the terminals 30 face the insertion recess 24 and insertion of the circuit board 10 into the insertion recess 24 can cause the elastic contactors 36 to come into contact with the circuit board 10 and to be displaced by a certain amount due to this contact. That is to say, the terminals 30 that are individually accommodated in the terminal accommodation compartments 22 between the top wall 21a and the intermediate wall 21c are retained by those terminal accommodation compartments 22 such that their elastic contactors 36 face downward, and the terminals 30 that are individually accommodated in the terminal accommodation compartments 22 between the bottom wall 21b and the intermediate wall 21c are accommodated in those terminal accommodation compartments 22 such that their elastic contactors 36 face upward.

As shown in FIGS. 1 and 2, the connector C is provided with a dust protection member 26 that covers a certain range of the housing H including a front end thereof, and thus the insertion recess 24 is protected against dust. The dust protection member 26 is formed by overlaying a sheet made of a resin material on the housing H. Specifically, the dust protection member 26 is formed of a sheet having a sheet main body layer made of a thermoplastic resin, such as polyvinyl chloride, polyethylene, or polyester, and an adhesive layer made of, for example, a butyl rubber pressure sensitive adhesive, a thermosetting liquid adhesive such as epoxy resin, or the like, the sheet being bonded and fixed to the housing H by the adhesive layer. The material for the dust protection member 26 is selected and the thickness thereof is set so that the circuit board 10 can penetrate the dust protection member 26 when the circuit board 10 is inserted into the insertion recess 24. The dust protection member 26 on at least a front end surface of the housing H is fixed to the housing H in a state in which it is stretched along the front end surface.

The above-described dust protection member 26 may be provided on the housing H in advance, but in the present embodiment, the dust protection member 26 is provided on the housing H after the terminals 30 have been attached to the wires W and the terminals 30 have been housed in the housing H, that is, for example, in the final stage of the manufacturing process of the wire harness.

Figure 6:
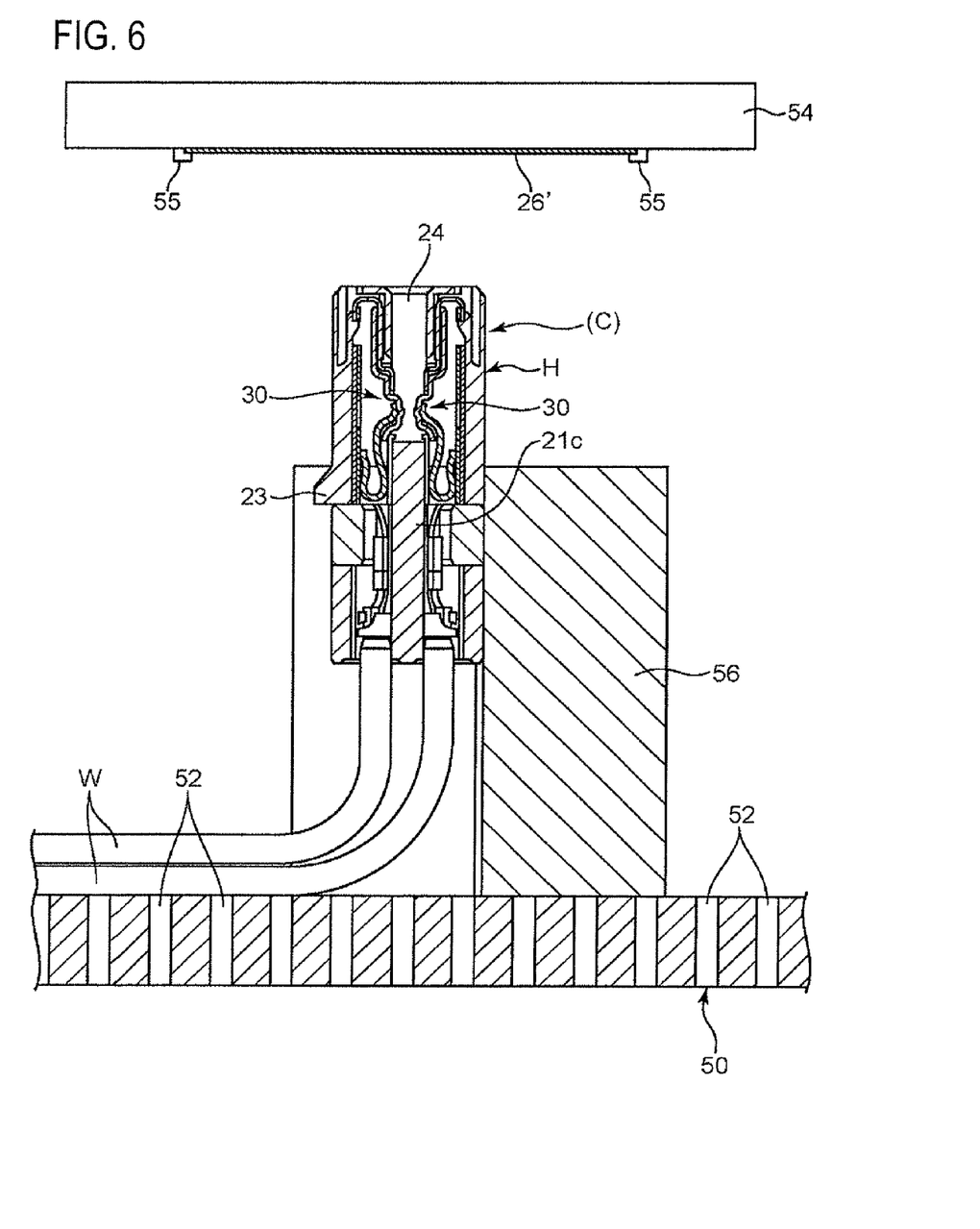
FIG. 6 is a schematic showing a manufacturing process of the card edge connector (cross-sectional view of the card edge connector and a vacuum forming machine)

The dust protection member 26 is formed by fixing the sheet to the housing H using, for example, a vacuum forming machine as shown in FIG. 6. This vacuum forming machine has a vacuum forming mold 50 having a flat upper surface. The upper surface of the vacuum forming mold 50 has a plurality of vacuum ports 52. These vacuum ports 52 are connected to a vacuum pump, which is not shown, via an air passage, and the vacuum pump suctions air over the vacuum ports 52 through the vacuum ports 52. Moreover, a heater 54 is disposed above the vacuum forming mold 50. The heater 54 has retaining portions 55 for retaining a sheet on a lower surface thereof.

First, as shown in this drawing, the housing H, in a state in which it is retained by a jig 56, is placed on the vacuum forming mold 50. Specifically, the housing H is placed in a state in which the front end surface of the housing H faces directly up. Meanwhile, a sheet 26' that constitutes the dust protection member 26 is retained on the lower surface of the heater 54 by the retaining portions 55. The sheet 26', which has the sheet main body layer made of a thermoplastic resin and the adhesive layer as described above, has a size that covers the front end surface and a part of the side surfaces (the top wall 21a, the bottom wall 21b, and the side walls 21d) of the housing H, and is retained on the lower surface of the heater 54 in a state in which the adhesive layer is situated on the lower side.

Figure 7:
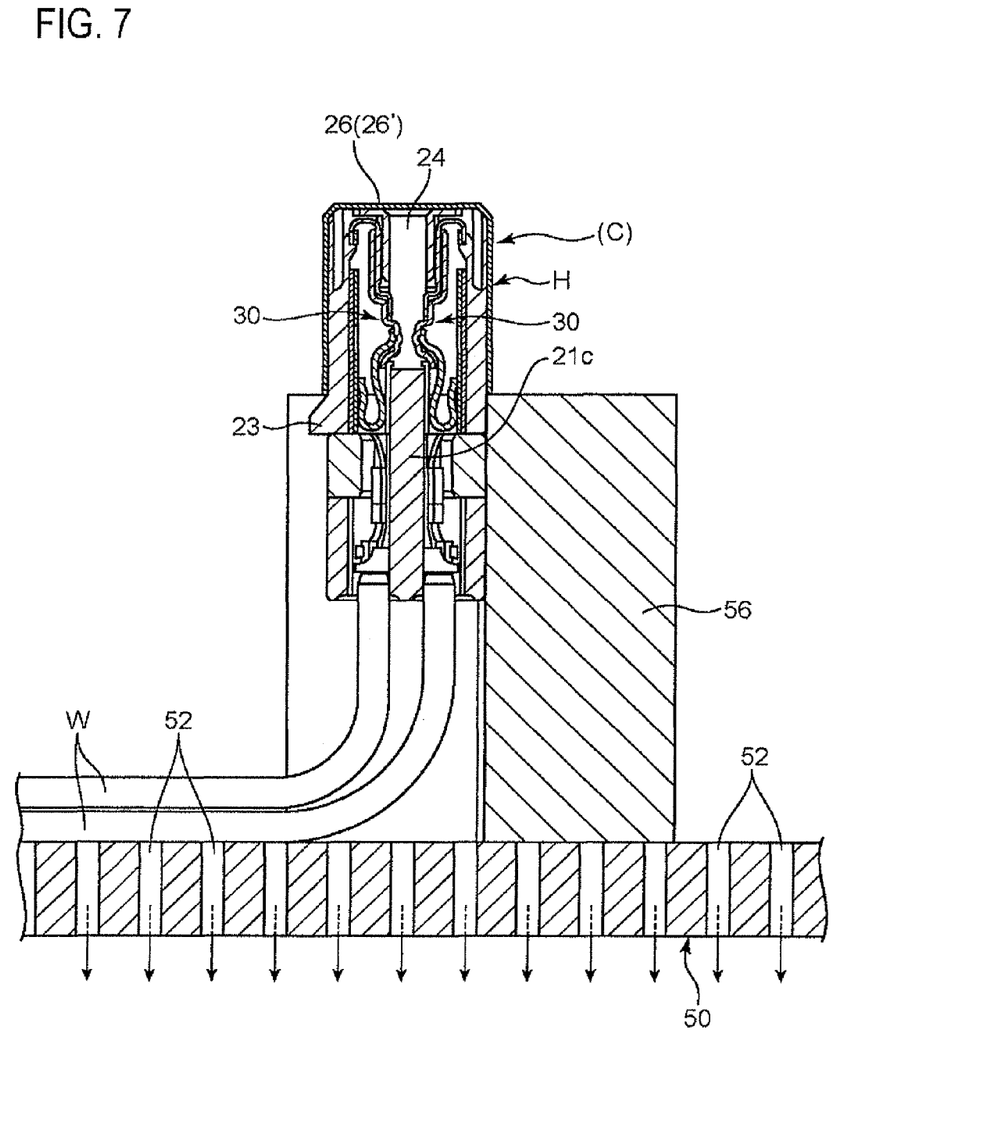
FIG. 7 is a schematic showing a manufacturing process of the card edge connector (cross-sectional view of the card edge connector and the vacuum forming machine)

Then, in a state in which the sheet 26' is softened by heating of the heater 54, the sheet 26' is separated from the heater 54, and furthermore, air is suctioned through the vacuum ports 52 at a predetermined timing. As a result, as shown in FIG. 7, the sheet 26' is overlaid on the housing H and is bonded and fixed to the housing H in a state of close contact with the front end surface and the side surfaces of the housing H. Thus, the dust protection member 26 is formed.

In this case, if a plurality of connectors C are included in the wire harness, the above-described formation of the dust protection member 26 is simultaneously performed with respect to these connectors C, thereby reducing or suppressing an increase in the number of man-hours. Moreover, if the manufacturing process of the wire harness includes a step of forming the trunk line or the branched wire group by binding a wire group together by overlaying the wire group with a sheet (equivalent to the above-described sheet 26') made of a resin material using the vacuum forming mold 50, this step and the step of forming the dust protection member 26 as described above are performed as a single step, thereby reducing or suppressing an increase in the number of manufacturing man-hours of the wire harness.

The connector C is connected to the electronic circuit unit EU by inserting the connector C into the case 12 (connector fitting portion 14) of the electronic circuit unit EU from the front end side of the connector C.

Figure 3:
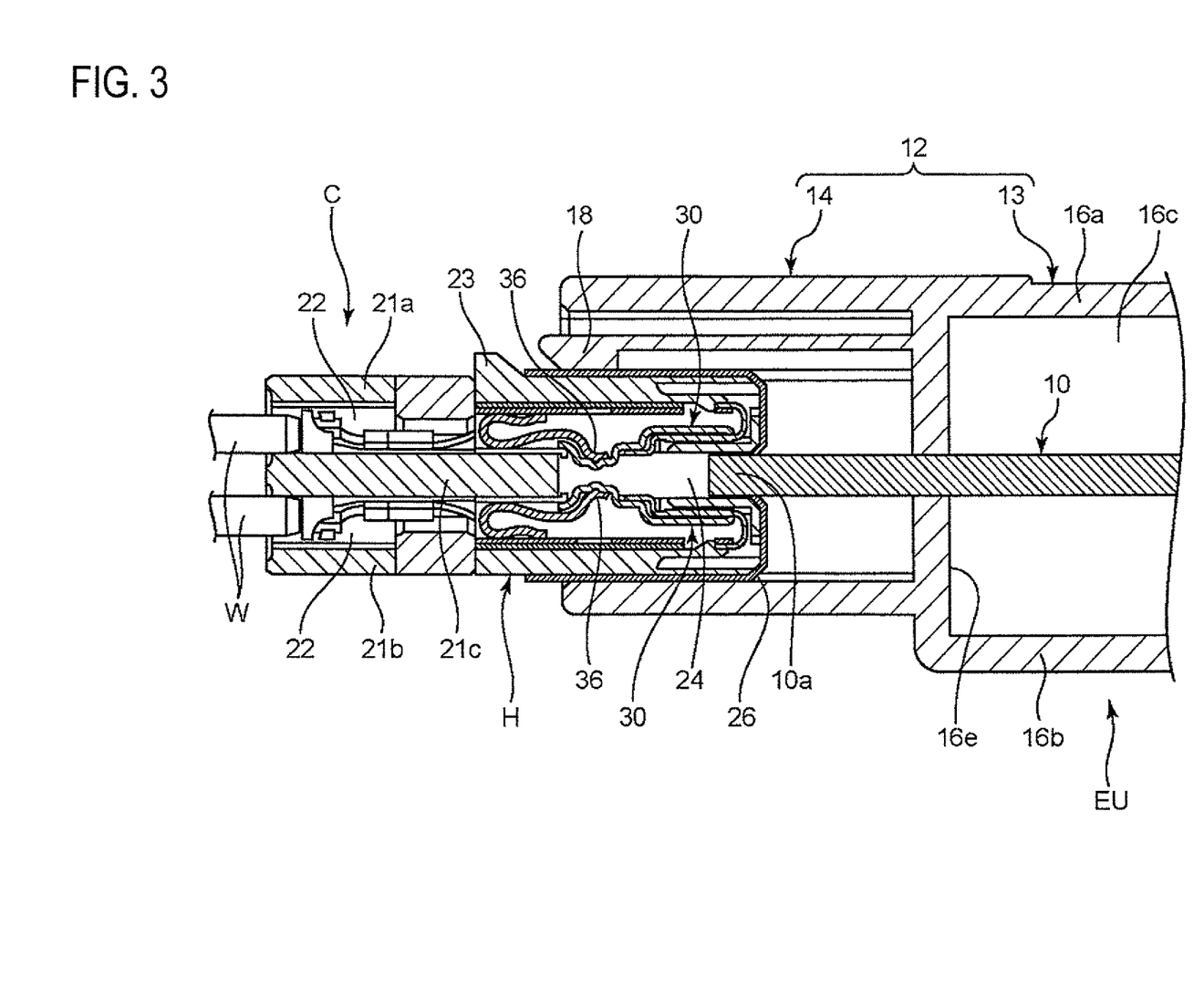
FIG. 3 is a cross-sectional view of the card edge connector and the electronic circuit unit (cross-sectional view showing a connecting process)

When the connector C is inserted into the connector fitting portion 14, as shown in FIG. 3, the circuit board 10 is inserted into the housing H (insertion recess 24) of the connector C in such a manner that the edge portion 10a thereof is inserted first. Due to this insertion, the dust protection member 26 of the connector C is penetrated by the leading end of the circuit board 10. At this time, the dust protection member 26 is in a state in which it is stretched over a portion of an insertion opening of the board insertion recess 24, and a portion of the dust protection member 26 that is situated around the insertion opening is bonded and fixed to the housing H. Therefore, the dust protection member 26 is prevented or impeded from being pulled into the board insertion recess 24 during insertion of the circuit board 10 and is easily penetrated by the board insertion recess 24.

Figure 4:
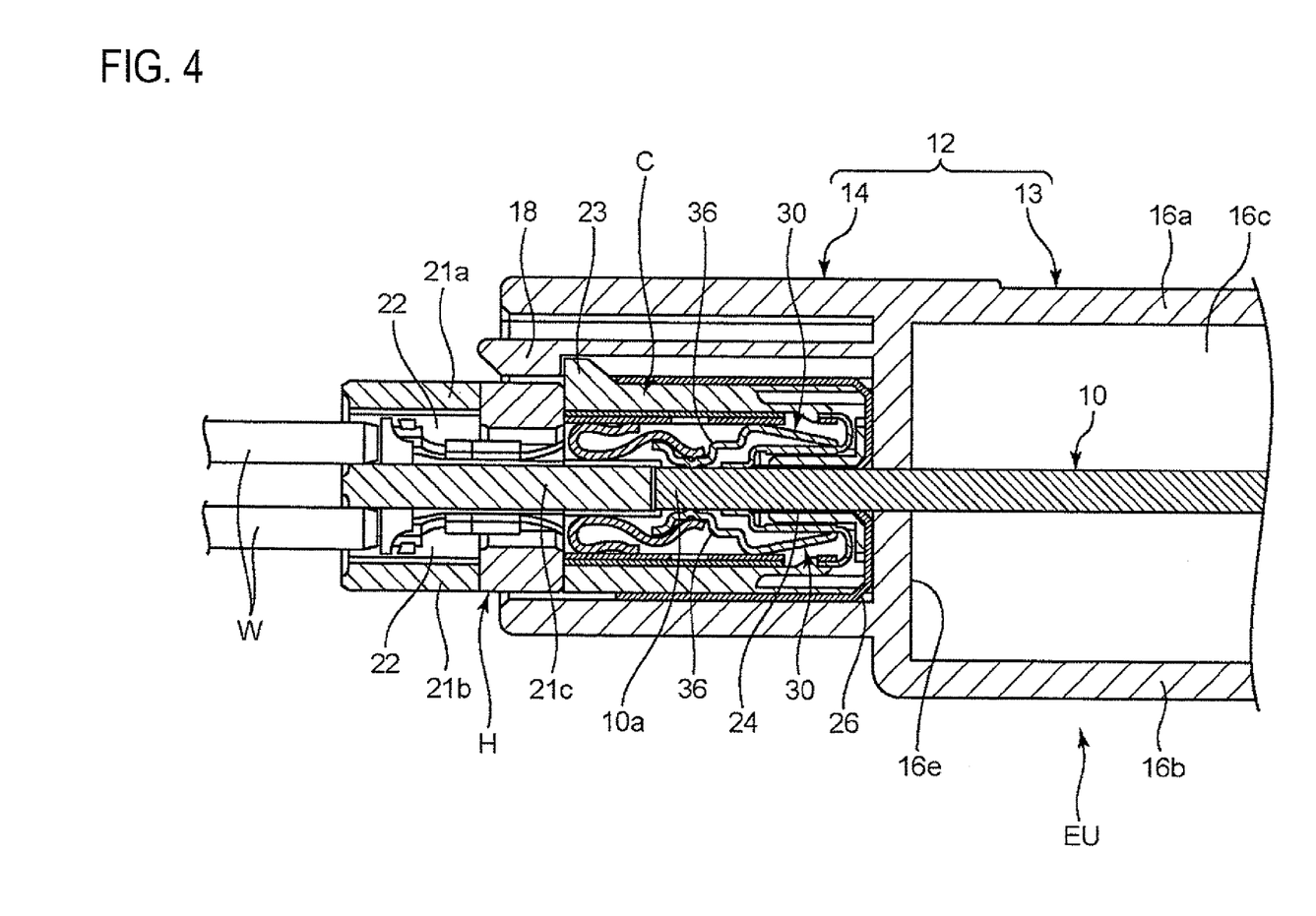
FIG. 4 is a cross-sectional view of the card edge connector and the electronic circuit unit (cross-sectional view showing a connected state)

Then, as shown in FIG. 4, when the leading end of the circuit board 10 has reached a position at which it abuts against the front end of the intermediate wall 21c of the housing H of the connector C, a state is created in which the connecting conductors provided on both surfaces of the edge portion 10a of the circuit board 10 simultaneously come into contact with the corresponding elastic contactors 36 of the terminals 30, and thus the connector C is connected to the circuit board 10.

Then, in the state in which the connector C is connected to the circuit board 10 shown in this drawing, an elastic locking piece 18 that is formed in the case 12 (connector fitting portion 14) of the electronic circuit unit EU engages with a locking portion 23 that is formed in the housing H (top wall 21a) of the connector C, and this engagement maintains the connected state.

With the wire harness as described above, the insertion recess 24 of the housing H is protected against dust by providing the connector C with the dust protection member 26. Thus, it is possible to reduce or prevent the occurrence of the problem that foreign matter may enter the interior of the insertion recess 24 during a period of time between the end of manufacturing of the wire harness and the actual connection of the connector C to the electronic circuit unit EU, adhere to the elastic contactors 36 of the terminals 30, and cause a bad connection.

Moreover, the dust protection member 26 is formed of a sheet made of a resin material, such as polyvinyl chloride, and during connection of the connector C to the circuit board 10, as described above, the dust protection member 26 is easily penetrated by the circuit board 10 when an insertion operation of the circuit board 10 is performed. Thus, it is not necessary to remove the dust protection member 26, and the connector C can be connected to the circuit board 10 by a connecting operation that is equivalent to the connecting operation of a connector without the dust protection member 26. Therefore, in the operation of installing and connecting the wire harness, the above-described effects can be achieved without increasing the number of man-hours.

In addition, since the dust protection member 26 can be easily formed by overlaying the housing H with a sheet made of a resin material using a vacuum forming machine as described above, the above-described effects can be achieved without significantly increasing the cost.

Second Embodiment

Figure 8:
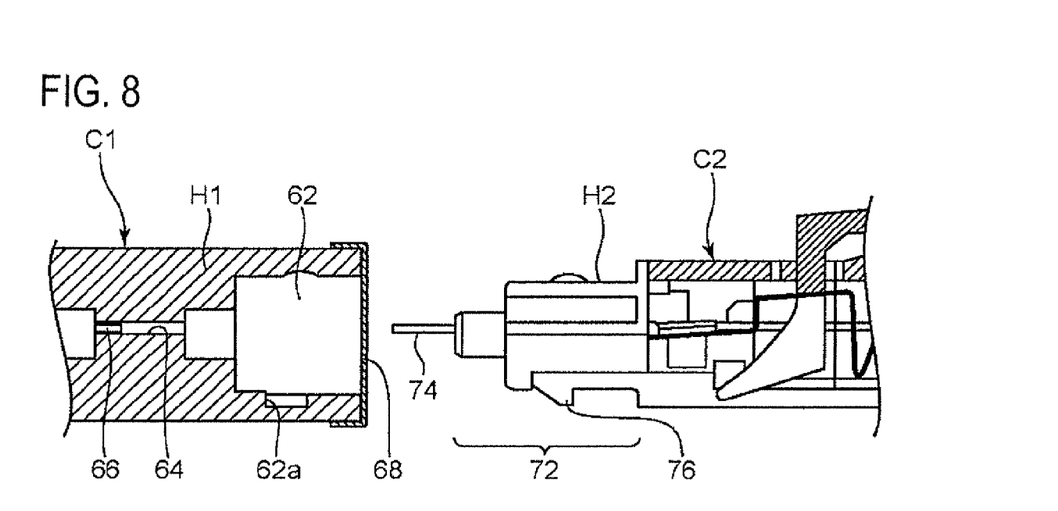
FIG. 8 is a cross-sectional view of a first optical connector according to an embodiment, and a second optical connector (counterpart connector) (cross-sectional view showing a state before connection)

FIG. 8 is a cross-sectional view schematically showing optical connectors attached to respective optical cables (wiring materials), that is, a first optical connector C1 according to an embodiment and a second optical connector C2 (corresponding to a counterpart connector of an embodiment) to be connected thereto. The first optical connector C1 may be, for example, attached to an end of the optical cable that is included in the above-described wire harness as one of the wiring materials.

As shown in this drawing, the first optical connector C1 includes a first housing H1 that is produced by forming an insulating material, such as plastic and a ferrule 66 (corresponding to a first fiber terminal of an embodiment) that is attached to an end of an optical fiber core.

Although not shown in detail, the ferrule 66 may be, for example, a tube-shaped member composed of a resin material and having a small fiber hole into which an optical fiber is inserted and a fixing hole that is larger than the fiber hole, these holes being arranged in an axial direction. The ferrule 66 is attached to the end of the fiber core in such a manner that the optical fiber core, in a state in which the optical fiber is exposed by stripping the coating on that end, is inserted into the fixing hole from that end side, then the optical fiber is inserted into the fiber hole, and in this state, a coating portion that is located rearward of this position is bonded to a portion of the fixing hole.

The first housing H1 is a female housing having an insertion recess 62 into which a second housing H2 of the second optical connector C2 can be inserted. An inner end portion of the insertion recess 62 of the first housing H1 has a ferrule accommodating hole 64, and the first housing H1 retains the ferrule 66 and an end portion of the optical fiber core together in a state in which the ferrule 66 is located in this ferrule accommodating hole 64.

The first optical connector C1 is provided with a dust protection member 68 that covers a certain range of the first housing H1 including a front end (right end in FIG. 8), and thus the insertion recess 62 is protected against dust. The dust protection member 68 is equivalent to the dust protection member of the first embodiment, and the material for the dust protection member 68 is selected and the thickness thereof is set so that the dust protection member 68 can be penetrated by the second optical connector during coupling of the connectors. The method for forming the dust protection member 68 is equivalent to that of the first embodiment, and a description thereof is not given here.

On the other hand, the second optical connector C2 includes the second housing H2 that is produced by forming an insulating material, such as plastic, and a ferrule 74 (corresponding to a second fiber terminal of the present invention) that is attached to an end of an optical fiber core.

The ferrule 74 is equivalent to the above-described ferrule 66 of the first optical connector C1 and is attached to the fiber core in the same manner as the ferrule 66.

The second housing H2 is a male housing including at a front end thereof a fitting portion 72 that can be fitted into the insertion recess 62 of the first housing H1 of the first optical connector C1. As shown in this drawing, the first housing H1 retains the ferrule 74 and an end portion of the optical fiber core together in a state in which a portion of the ferrule 74 protrudes from the leading end of the fitting portion 72.

Figure 9:
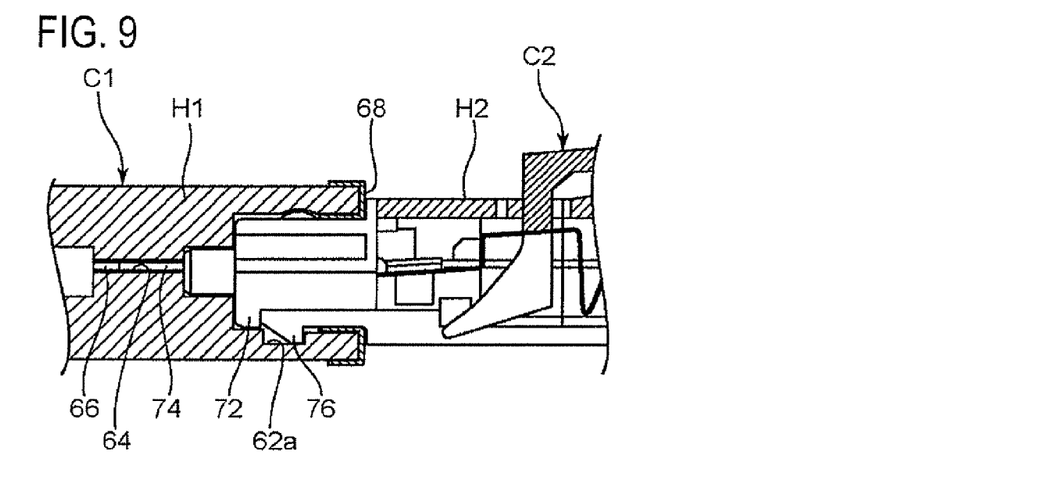
FIG. 9 is a cross-sectional view of the first optical connector and the second optical connector (cross-sectional view showing a connected state).

The first optical connector C1 and the second optical connector C2 are connected to each other by arranging the connectors C1 and C2 so as to face each other as shown in this drawing and inserting the second housing H2 of the second optical connector C2 into the insertion recess 62 of the first housing H1 of the first optical connector C1 from the front end side. When the second housing H2 is inserted into the first housing H1 in this manner, the dust protection member 68 of the first optical connector C1 is penetrated by the leading end of the second optical connector C2 due to the insertion. Then, as shown in FIG. 9, when the front end of the second housing H2 has reached a position at which it abuts against the inner end portion of the insertion recess 62 of the first housing H1, the ferrule 74 of the second optical connector C2 is inserted into the ferrule accommodating hole 64 and is in a state in which it is abutted against the ferrule 66 of the counterpart, and thus the optical fiber on the side of the first optical connector C1 and the optical fiber on the side of the second optical connector C2 are connected to each other.

Then, in the state in which the first optical connector C1 and the second optical connector C2 are connected to each other shown in this drawing, a locking piece 76 that is formed in the second housing H2 engages with a locking recess 62a that is formed in an internal side face of the insertion recess 62 of the first housing H1, and this engagement maintains the connected state.

With the wire harness of the second embodiment as described above, the same effects as those of the first embodiment can be achieved with respect to a composite wire harness including an optical cable. That is to say, since the first optical connector C1 is provided with the dust protection member 68 to protect the insertion recess 62 against dust, it is possible to prevent the occurrence of the problem that foreign matter may enter the interior of the insertion recess 62 during a period of time until the first optical connector C1 is connected to the second optical connector C2, obstruct the ferrule accommodating hole 64, and cause a bad connection of the optical fibers. Moreover, during connection of the connectors C1 and C2, the dust protection member 68 is penetrated by the second optical connector C2. This makes it possible to connect the connectors C1 and C2 to each other without removing the dust protection member 68. Therefore, in the operation of installing and connecting the wire harness including the above-described optical cable, the above-described effects can be achieved without increasing the number of man-hours.

While some embodiments of the present invention have been described above, this description is for illustrative purposes only. The specific configurations of the connectors C, C1, and C2 and the electronic circuit unit EU as well as the specific methods for forming the dust protection members 26 and 68 which have been described in these embodiments can be appropriately changed without departing from the gist of the present invention.

For example, in the first embodiment, the dust protection member 26 is formed so as to cover the front end surface and a part of the side surfaces (top wall 21a, bottom wall 21b, and side walls 21d) of the connector C (housing H). However, the dust protection member 26 may only cover the front end surface of the connector C, or may cover the entire connector C. In short, it is sufficient that the dust protection member 26 can protect the insertion recess 24 against dust and can be penetrated by the circuit board 10 during connection to the circuit board 10. The same applies to the second embodiment.

Moreover, in the first embodiment, the sheet 26' having the sheet main body layer made of polyvinyl chloride or the like and the adhesive layer is employed, and the dust protection member 26 is formed by bonding and fixing the sheet 26' to the housing H. However, it is also possible to employ a sheet having no adhesive layer and to form the dust protection member 26 by overlaying the sheet on the housing H using thermal shrinkage of the sheet. The same applies to the second embodiment.

Moreover, in the first embodiment, the sheet 26' having the sheet main body layer made of a thermoplastic resin is employed, and is put over the housing H in a state in which the sheet 26' is softened by the heater 54. However, this configuration is adopted because of its advantage in causing the sheet 26' to fit with the external shape of the housing H, and the material of the sheet 26' is not limited to those mentioned in the embodiments.

The foregoing description of the present invention can be summarized as follows.

A connector according to another embodiment connects a wiring material to a connecting target member and has a dust protection function, the connector including a terminal member including a contact portion that can be brought into contact with the connecting target member, the terminal member being attached to an end of the wiring material, a housing including an insertion recess into which the connecting target member can be inserted, the housing retaining the terminal member such that the contact portion can be brought into contact with the connecting target member inserted into the insertion recess, and a dust protection member that protects the insertion recess against dust by blocking an insertion opening of the insertion recess, wherein the dust protection member is formed such that the dust protection member can be penetrated by the connecting target member when the connecting target member is inserted into the insertion recess.

With this connector, the dust protection member blocks the insertion opening of the insertion recess of the housing, thereby protecting the insertion recess against dust, and thus foreign matter is prevented or impeded from entering the insertion recess and adhering to the contact portion. Moreover, the dust protection member is formed such that the dust protection member can be penetrated by the connecting target member when the connecting target member is inserted into the insertion recess, and thus it is possible to connect the wiring material to the connecting target member without removing the dust protection member.

In this connector, the dust protection member includes a sheet made of a resin material, the sheet being fixed to the housing at least at a position around the insertion recess of the housing.

With this configuration, it is possible to form a dust protection member that reliably prevents or impedes dust from entering the insertion recess and that can be easily penetrated by the connecting target member when the connecting target member is inserted into the insertion recess. In addition, since the sheet is fixed to the housing at the position around the insertion recess of the housing, the dust protection member is prevented or impeded from being shifted with respect to the insertion opening, and furthermore, during insertion of the connecting target member into the housing (insertion recess), the dust protection member is prevented or impeded from being pulled into the insertion recess. Thus, the ease of breakage (the ease of penetration) of the dust protection member by the connecting target member is enhanced. Furthermore, since the dust protection member is formed of the sheet made of a resin material, the dust protection member can be provided at a relatively low cost.

In this case, although the sheet may be fixed to the housing by fusion welding or other methods, it may be beneficial that the sheet is fixed to the housing by being bonded to the housing.

With this configuration, it is possible to fix the sheet to the housing and form the dust protection member in a simple manner at a low cost.

With respect to a specific configuration of the above-described connector, the terminal member is a connector terminal attached to an end of a wire serving as the wiring material and includes an elastic contactor serving as the contact portion, the elastic contactor being capable of displacement in a direction that is orthogonal to a terminal axial direction, the housing includes the insertion recess into which a circuit board can be inserted, the circuit board serving as the connecting target member and including a connecting conductor on a surface of an edge portion of the circuit board, and retains the connector terminal such that the elastic contactor can be brought into contact with the connecting conductor of the circuit board inserted into the insertion recess, and the dust protection member is formed such that the dust protection member can be penetrated by the circuit board when the circuit board is inserted into the insertion recess.

In this configuration, some embodiments are applied to a so-called card edge connector. That is to say, as a result of insertion of the circuit board into the insertion recess of the housing, the elastic contactor of the connector terminal retained by the housing comes into contact with the connecting conductor provided on the edge portion of the circuit board, and this contact establishes an electric connection between the wire and the circuit board. With this connector, the insertion opening of the insertion recess of the housing is blocked by the dust protection member, so that foreign matter is prevented or impeded from entering the insertion recess and adhering to the elastic contactor of the connector terminal. In addition, during connection of the connector, the dust protection member is penetrated by the circuit board when the circuit board is inserted into the insertion recess.

With respect to another specific configuration of the above-described connector, the terminal member is a first fiber terminal that is attached to an end of an optical fiber serving as the wiring material, the first fiber terminal including an end surface serving as the contact portion, the housing includes the insertion recess into which a counterpart connector can be inserted, the counterpart connector serving as the connecting target member and including a second fiber terminal that is attached to an end of a counterpart optical fiber connectable to the optical fiber and a housing that retains the second fiber terminal, and retains the first fiber terminal such that a state is created in which the second fiber terminal that is retained by the housing of the counterpart connector inserted into the insertion recess and the first fiber terminal are abutted against each other, and the dust protection member is formed such that the dust protection member can be penetrated by the counterpart connector when the counterpart connector is inserted into the insertion recess.

In this configuration, some embodiments are applied to a so-called optical connector. That is to say, as a result of insertion of the counterpart connector into the insertion recess of the housing of the connector, the first fiber terminal retained by this housing and the second fiber terminal retained by the housing of the counterpart connector are abutted against each other, and thus the optical fibers equipped with the respective fiber terminals are connected to each other. With this connector, since the insertion opening of the insertion recess of the housing is blocked by the dust protection member, foreign matter is prevented or impeded from entering the insertion recess. In addition, during connection of the connector, the dust protection member is penetrated by the counterpart connector when the counterpart connector is inserted into the insertion recess.

Meanwhile, a method for manufacturing a connector according to an embodiment includes a connector assembling step of attaching the terminal member to an end of a wiring material and causing the terminal member to be retained by the housing, and a dust protection member forming step of forming the dust protection member on the housing, wherein the dust protection member forming step includes a step of disposing the housing on a mold surface of a vacuum forming mold in an orientation in which the insertion recess opens upward, the mold surface having a plurality of vacuum ports through which air is suctioned, a step of placing a sheet over the housing such that the sheet covers the insertion opening of the insertion recess, and a step of bringing the sheet into close contact with the housing by suctioning air through the vacuum ports of the vacuum forming mold.

With this method, it is possible to easily and inexpensively manufacture the above-described connector.

Moreover, a wire harness according to an embodiment includes a plurality of wiring materials, wherein the wire harness includes the above-described connector at an end of a specific wiring material of the wiring materials.

Moreover, a method for connecting a wiring material to a connecting target member according to an embodiment includes a step of attaching a terminal member to an end of the wiring material, providing a housing for retaining the terminal member, the housing including an insertion recess into which the connecting target member can be inserted, and causing the terminal member to be retained by the housing, a step of forming a dust protection member on the housing, the dust protection member protecting the insertion recess against dust by blocking an insertion opening of the insertion recess of the housing, and a step of bringing the connecting target member into contact with the terminal by inserting the connecting target member into the insertion recess of the housing in such a manner that the connecting target member penetrates the dust protection member.

With the wire harness and the connecting method as described above, the operation of installing the wiring material and connecting the wiring material to the connecting target member can be performed equivalently to a common operation while effectively preventing or impeding foreign matter from entering the housing (insertion recess) of the connector. That is to say, it is not necessary to remove the dust protection member from the connector, and thus it is possible to carry out the operation of connecting the wiring material to the connecting target member in the same manner as a common connector connecting operation.

As described above, the connector, the method for manufacturing the connector, the wire harness, and the method for connecting the wiring material to the connecting target member according to some of the disclosed embodiments relate to technologies that can effectively prevent, impede, or reduce the occurrence of a bad connection due to entry of dust or the like, while reducing or suppressing increases in the number of man-hours and the cost, and therefore are useful in the fields of the manufacture of wire harnesses and the like for vehicles and the manufacture of vehicles and the like.

The invention claimed is:

1. A connector for connecting a wiring material to a connecting target member and having a dust protection function, the connector comprising:
   a terminal member including a contact portion that can be brought into contact with the connecting target member, the terminal member being attached to an end of the wiring material;
   a housing including: (i) a top wall, (ii) a bottom wall, and (ii) an insertion recess into which the connecting target member can be inserted, the housing retaining the terminal member such that the contact portion can be brought into contact with the connecting target member inserted into the insertion recess, the insertion recess defining an insertion opening; and
   a dust protection member formed of a sheet having a uniform thickness, the sheet overlapping a surface of the top wall and overlapping a surface of the bottom wall such that the insertion recess of the housing is covered by the sheet, the dust protection member being configured to protect the insertion recess against dust by blocking the insertion opening of the insertion recess, the dust protection member being configured to be penetrated by the connecting target member when the connecting target member is inserted into the insertion recess.

2. The connector according to claim 1,
   wherein the dust protection member includes a sheet made of a resin material, the sheet being fixed to the housing at least at a position around the insertion recess of the housing.

3. The connector according to claim 2,
   wherein the sheet is fixed to the housing by being bonded to the housing.

4. The connector according to claim 1,
   wherein the terminal member is a connector terminal attached to an end of a wire serving as the wiring material and includes an elastic contactor serving as the contact portion, the elastic contactor being capable of displacement in a direction that is orthogonal to a terminal axial direction,
   the housing includes the insertion recess into which a circuit board can be inserted, the circuit board serving as the connecting target member and including a connecting conductor that is provided on a surface of an edge portion of the circuit board, and retains the connector terminal such that the elastic contactor can be brought into contact with the connecting conductor of the circuit board inserted into the insertion recess, and
   the dust protection member is formed such that the dust protection member can be penetrated by the circuit board when the circuit board is inserted into the insertion recess.

5. The connector according to claim 1,
   wherein the terminal member is a first fiber terminal that is attached to an end of an optical fiber serving as the wiring material, the first fiber terminal including an end surface serving as the contact portion,
   the housing includes the insertion recess into which a counterpart connector can be inserted, the counterpart connector serving as the connecting target member and including a second fiber terminal that is attached to an end of a counterpart optical fiber connectable to the optical fiber and a housing that retains the second fiber terminal, and retains the first fiber terminal such that a state is created in which the second fiber terminal that is retained by the housing of the counterpart connector inserted into the insertion recess and the first fiber terminal are abutted against each other, and the dust protection member is formed such that the dust protection member can be penetrated by the counterpart connector when the counterpart connector is inserted into the insertion recess.

6. A method for manufacturing the connector according to claim 1, comprising:
attaching the terminal member to an end of a wiring material and causing the terminal member to be retained by the housing; and
forming the dust protection member on the housing, the dust protection member forming step including:
disposing the housing on a mold surface of a vacuum forming mold in an orientation in which the insertion recess opens upward, the mold surface having a plurality of vacuum ports through which air is suctioned;
placing a sheet over the housing such that the sheet covers the insertion opening of the insertion recess; and
bringing the sheet into close contact with the housing by suctioning air through the vacuum ports of the vacuum forming mold.

7. A wire harness, comprising:
a plurality of wiring materials; and
the connector according to claim 1 at an end of a specific wiring material of the wiring materials.

8. A method for connecting a wiring material to a connecting target member, the method comprising:
attaching a terminal member to an end of the wiring material, providing a housing for retaining the terminal member, the housing including: (i) a top wall, (ii) a bottom wall, and (ii) an insertion recess into which the connecting target member can be inserted, and causing the terminal member to be retained by the housing;
fixing a dust protection member having a uniform thickness, the dust protection member overlapping a surface of the top wall and overlapping a surface of the bottom wall such that the insertion recess of the housing is covered by the dust protection member, the dust protection member being configured to protect the insertion recess against dust prior to insertion of the connecting target member in the insertion recess by blocking an insertion opening of the insertion recess of the housing; and
bringing the connecting target member into contact with the terminal by inserting the connecting target member into the insertion recess of the housing in such a manner that the connecting target member penetrates the dust protection member.

9. The connector according to claim 1, wherein:
the housing further includes a first side wall and a second side wall, and
the sheet is fixed to a surface of the first side wall and a surface of the second side wall.

10. The method according to claim 8, wherein:
the housing further includes a first side wall and a second side wall, and
the dust protection member is fixed to a surface of the first side wall and a surface of the second side wall.

11. The connector according to claim 1, wherein a case of the connecting target member includes an elastic locking piece that is in sliding contact with the dust protection member fixed to the outer surface of the top wall and the outer surface of the bottom wall.

12. The method according to claim 8, wherein a case of the connecting target member includes an elastic locking piece that is in sliding contact with the dust protection member fixed to the surface of the top wall and the surface of the bottom wall.

* * * * *